Aug. 20, 1963   N. GAGLIARDI   3,101,400
HARDENING COIL AND METHOD OF HEAT TREATMENT
OF TOOTHED METAL STRIPS
Filed Feb. 23, 1961
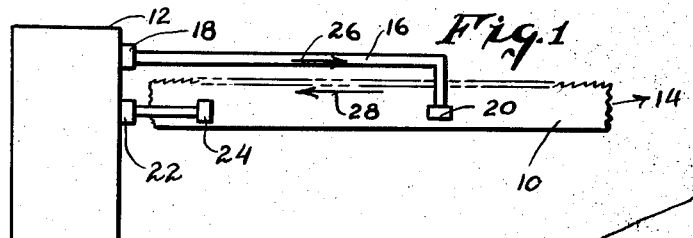
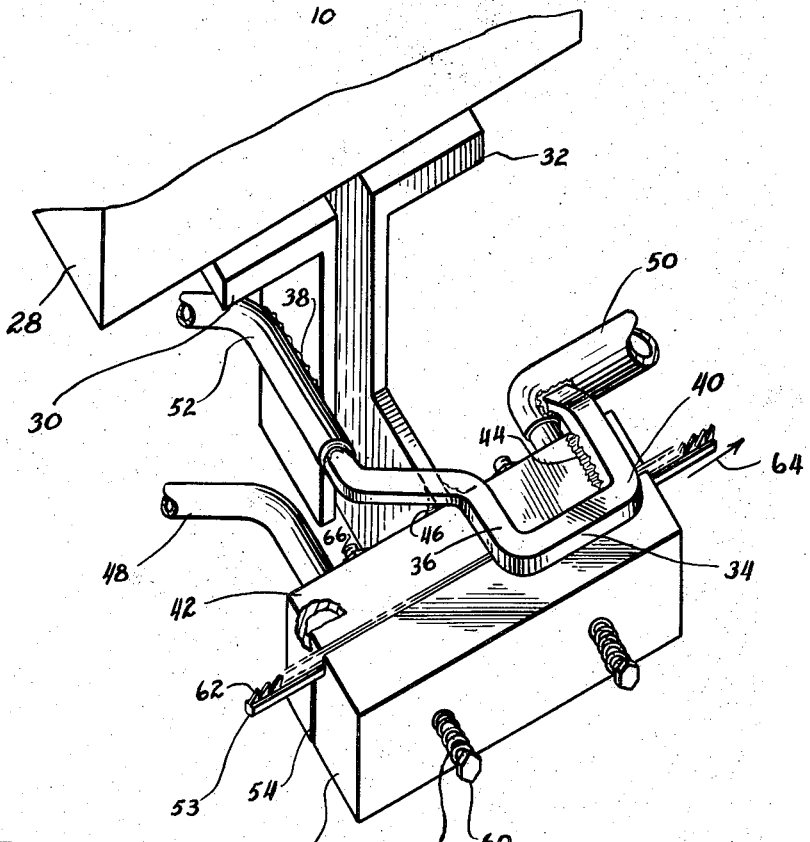
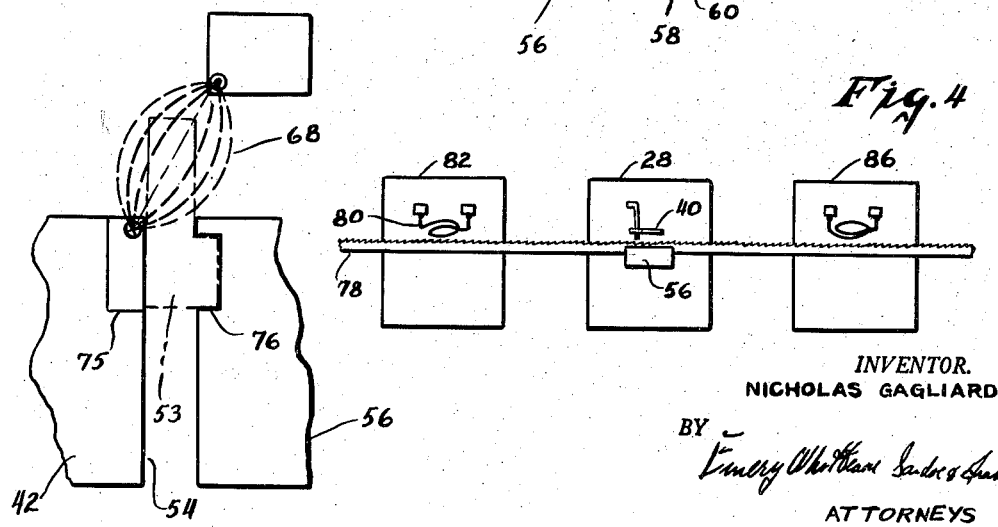
INVENTOR.
NICHOLAS GAGLIARDI
BY
ATTORNEYS

United States Patent Office 3,101,400
Patented Aug. 20, 1963

3,101,400
HARDENING COIL AND METHOD OF HEAT TREATMENT OF TOOTHED METAL STRIPS
Nicholas Gagliardi, Brooklyn, N.Y., assignor to Induction Heating Corporation, Brooklyn, N.Y., a corporation of New York
Filed Feb. 23, 1961, Ser. No. 91,143
7 Claims. (Cl. 219—10.43)

This invention relates to an improved method of heat treatment of toothed metal strips, such as carding wire and saw blades, and to induction heating coils for such heat treatment.

In the manufacture of band-saw blades, carding wire and the like, the ideal manufacturing process will ideally produce a saw in which the blade or body portion is a toughened, unhardened steel and the teeth are hardened by heat treatment.

Since the saw blade is usually work hardened in the forming process, it is also advantageous to provide means for annealing of the body portion.

The various types of flame treatment and/or oven treatment has not been entirely satisfactory. Due to the high heat to which the formed teeth must be raised, the blade or body will be heated by heat conduction from the teeth. Drawing or annealing the blade by a subsequent operation has not cured this difficulty due to simultaneous tempering of the material in the teeth. Further, control difficulties are encountered in the use of flame treatments.

It is known that induction heating of strip material, such as high speed steel, has many advantages. The rapidity with which the material may be raised above the critical temperature and cooled down after reaching this temperature prevents undesirable grain growth and provides heat treated steel substantially free of undissolved carbides.

However, when induction heating apparatus is employed in an attempt to heat treat the teeth of saw blades and the like, the loose coupling due to the small volume of the workpiece with respect to the volume of the work coil has made such heat treatment impractically expensive despite the inherent advantages thereof.

For example, attempts have been made to establish a high frequency field transversely across the teeth alone of the saw. However, the impossibility of generating a field having the necessary field strength which drops to zero at the periphery thereof, coupled with the problem of heat treatment of the blade by heat conduction from the teeth during slow heating, has made such attempts impractical.

Of course, at high frequencies, close coupling of the work coil to the saw may be accomplished by arrangements common to the art, such as using the saw as a return lead, to which the coil is coupled through a sliding contact. If the return currents were distributed through the blade body, such coupling methods would be successful. However, at the frequencies necessary for the requisite close coupling, the proximity effect results in crowding of the return current to the blade surface adjacent the coil. Thus, the return currents are crowded into a small layer directly under the roots of the teeth, heating the blade itself. The heating of the blade makes at least a portion of the blade hard and brittle, which, in all applications is undesirable, and, in many cases such as band-saw blades, imposes a distinct hazard to the operator.

It is, therefore, the primary object of this invention to provide an improved method and means for the selective heat treatment of the blades having teeth along the periphery thereof, such as carding wire and band-saw blades.

It is a further object of this invention to provide an improved induction heating coil for the selective heat treatment of the tips of teeth carried on a body portion of strip form without heat treatment of the body.

In accordance with these objects, there is provided, in a preferred embodiment of this invention, a linearly extending work coil, one end of which is coupled to a source of high frequency electrical energy, and the other end of which is coupled to ground through a conductive block having a work face extending parallel with said work coil.

A non-conductive clamp member is provided to hold the blade against the work face of the conductive block with the teeth to be treated extending above the top surface of the block. This clamp is preferably spring biased to hold the blade in electrical contact with the block while the blade is drawn through the work coil.

When the coil is energized with electrical energy at high frequencies, a high frequency field is established between the linearly extending coil portion and the block which cuts through the teeth of the object inducing eddy currents therein to quickly raise the teeth to an elevated temperature required for heat treatment.

However, the return current is carried primarily by the conductive block peventing undesired heat treatment of the body or blade portion below the roots of the teeth. The block is subjected to heating by the return current, crowded to the surface by the proximity effects, but the larger mass of the block and water-cooling thereof dissipates the heating effect.

Thus, the teeth may be selectively heat treated, treatment of the tips of the teeth alone being controllably effected.

In accordance with the method of this invention the blade will be passed through an induction heating field to temper the body if the blade has been work hardened in manufacture, the teeth will be treated with a transverse induction field to harden them above a minimum desired hardness, and, if necessary, a relieving coil may be utilized to relieve the teeth hardness bringing it down to the requisite hardness.

This invention, along with further objects and advantages thereof, will be more clearly understood by reference to the following description taken in combination with the accompanying drawings, of which:

FIG. 1 is a diagrammatic view of an induction heating apparatus in accordance with the prior art;

FIG. 2 is a perspective view of an induction heating apparatus in accordance with the present invention;

FIG. 3 is a diagrammatic view of a portion of the apparatus shown in FIG. 2; and FIG. 4 is a diagrammatic view of an assembly line for heat treatment in accordance with the present invention.

In FIG. 1 there is shown a saw blade 10, such as a carding wire or a band-saw blade of high speed steel, being moved past an induction heating generator 12 in the direction of arrow 14 by conventional drive means (not shown).

A work coil 16 is coupled to power terminal 18 of the generator 12 and to the saw through a sliding contact 20. The circuit is completed through the saw blade to the ground terminal 22 of the generator through a second sliding contact 24.

Using frequencies in the megacycle range, the arrangement shown in FIG. 1 will establish a high frequency field which will be coupled to the saw with sufficient closeness to effect induction heating of the teeth with the required quickness of temperature rise.

However, at the high frequencies necessary for the close coupling, the proximity effect will cause crowding of the outgoing and return currents, illustrated by arrows 26 and 28 respectively, toward adjacent surfaces. The crowding of the return current to the surface will cause localized heating of the blade of the saw just below the roots of the teeth (e.g. the shortest electrical paths). Thus, the blade of the saw will be heat treated, becoming hard and brittle. Hardening of the blade is undesirable and, in applications such as band-saw blades, dangerous.

In FIG. 2 there is shown a high frequency generator 28 having power output terminal 30 and ground terminal 32. A linearly extending work coil 34 is provided, one end 36 of which is bent and connected to the power terminal 30 by brazing thereto at 38, and the other end 40 of which is coupled to a hollow conductive block 42 by coupling of the block to the ground terminal 32 by being brazed thereto at 46.

The block 42 is a hollow block fabricated of a copper alloy and is water cooled by water introduced therein, through pipe 48 and exhausted therefrom through pipe 50. Similarly, the work coil is constructed of hollow tubing and is water cooled via inlet pipe 52 and exhaust pipe 50.

The saw blade 53, such as carding wire illustrated, is urged into electrical contact with the work face 54 of the block by a non-conductive block 56, such as a ceramic block, which is spring loaded towards the working face by springs 58 on bolts 60. The saw blade 53 is held in contact with the work face with the teeth 62 thereof extending above the top surface of the block as the saw is pulled through the coil in direction of arrow 64 by conventional means (not illustrated). The spring tension may be adjusted by screwing the bolts further into the holding nuts 66.

As may best be seen by reference to FIG. 3, when the work coil is energized, an electro-magnetic field 68 will be established between the coil and block, sweeping through the teeth (the position of which is illustrated by dotted outline 70). The outgoing current 72 and return current 74 will concentrate at the corners due to the proximity effect, thus concentrating the field flux through the teeth. However, since the return current is carried by the block 42, no current will flow through the blade of the saw to heat the blade below the roots of the teeth. It is for this reason that the block 56 must be of nonconductive material, since a conductive block would change the field pattern and result in current flow through the saw blade.

The induced currents in the teeth of the saw will cause a rapid rise in the temperature of the teeth. The teeth may then be quenched in conventional fashion. I have found that air quenching is usually sufficient due to the small volume of the teeth. The field concentration at the tips of the teeth allows control of the depth of hardening, from merely the tips of the teeth to the entire tooth depth by control of the field intensity and the time of application of the field. The close coupling allows very rapid heat treatment.

For example, carding wire of high speed steel can be processed at 100 ft./min. with a 7.5 kw., 11 megacycle generator. Control of the heat treat depth is precise at such speeds, and it is possible to heat treat the tips of the teeth alone, leaving the teeth roots and the blade in a desired tempered, tough state. The frequency can be varied, of course, but below about 5 mc./sec. the close coupling is not attained.

Since the work face of the coil is abraded by the wire, it is desirable to provide a replaceable insert 75 in the face for economy of operation. Similarly, it is desirable to provide a locating slot 76 in the ceramic block to hold the wire in its desired position.

In FIG. 4 there is shown an assembly line in accordance with the present invention.

The carding wire 78 or the like is fed through the field coil 80 of an induction heating generator 82 to temper the entire blade and teeth, thereby relieving work hardening of the wire caused by manufacture thereof.

The teeth are then hardened by generator 28 in having a work coil as detailed in FIG. 2. The teeth are hardened to a Rockwell hardness exceeding the application requirements (such as 68 Rockwell).

The teeth are then relieved by the coil 84 of generator 86 to the desired hardness, such as 62 Rockwell in a typical application.

By this method, rapid production rates are achieved, the grain size of the teeth are desirably small, and the hardness of the teeth and body can be controlled.

This invention may be variously embodied and modified within the scope of the subjoined claims.

What is claimed is:

1. The method of heat treating the teeth alone of a toothed object such as carding wire, which comprises establishing a high frequency electro-magnetic field between a linear work coil and a return conductor, drawing said object through said coil, and holding the body of the object in contact with said return conductor and with the teeth extending into said electro-magnetic field during drawing of said wire through said coil.

2. The method in accordance with claim 1 which includes tempering the wire by an induction field prior to heat treatment of the teeth.

3. The method in accordance with claim 2 which includes tempering the teeth after heat treatment thereof.

4. An induction coil apparatus for the heat treatment of the teeth alone of a toothed object which comprises a linearly extending work coil, a conductive block having a working face disposed parallel to said coil, means to hold said object in electrical contact with said working face with the teeth thereof extending upwardly from the block towards said coil, and means for coupling high frequency electrical energy between said coil and said block.

5. A coil apparatus in accordance with claim 4 in which said holding means comprises a non-conductive block urged into contact with the working face of said conductive block.

6. A coil apparatus in accordance with claim 4 which includes means for drawing said wire through said coil.

7. A coil apparatus in accordance with claim 4 which includes means for water cooling said block and said coil.

References Cited in the file of this patent

UNITED STATES PATENTS 2,371,459    Mittelmann _____ Mar. 13, 1945
2,679,574    Wade _____ May 25, 1954